March 19, 1940. C. OTTO 2,194,404
COKE OVEN
Filed June 16, 1938 3 Sheets-Sheet 1
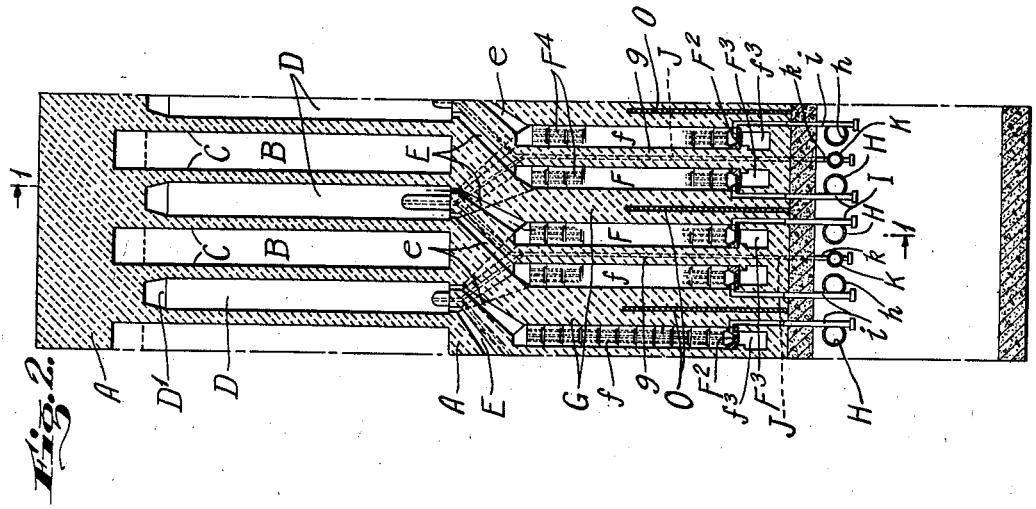
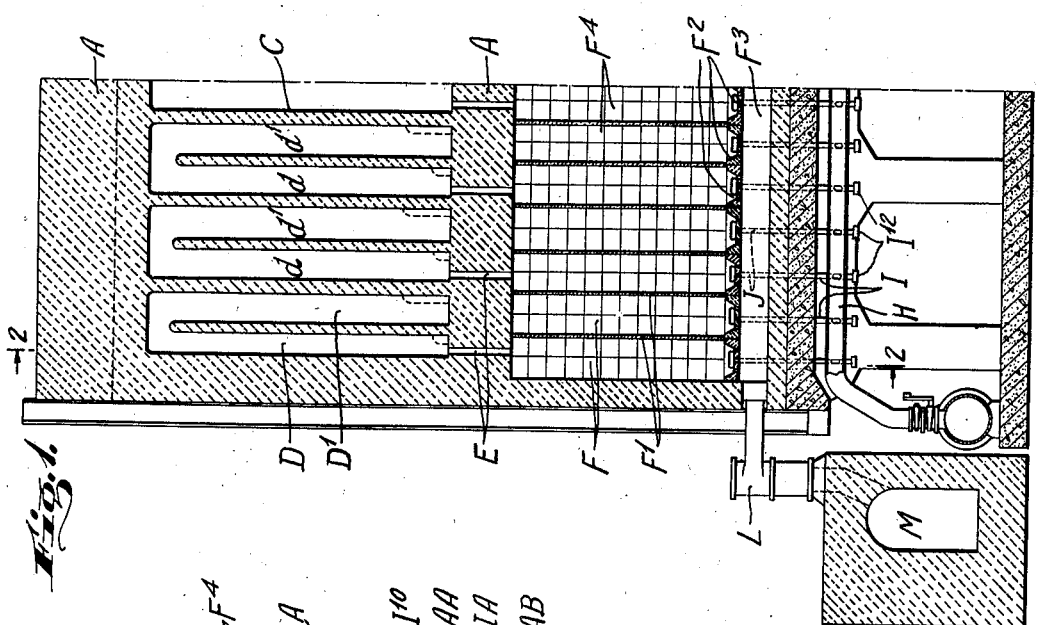
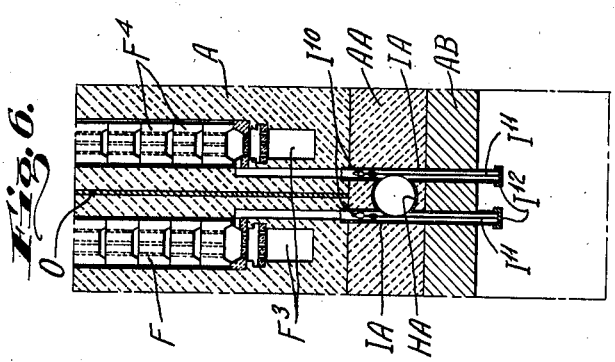
INVENTOR
Carl Otto
BY
John E. Hubbell
ATTORNEY March 19, 1940.   C. OTTO   2,194,404
COKE OVEN
Filed June 16, 1938    3 Sheets-Sheet 2
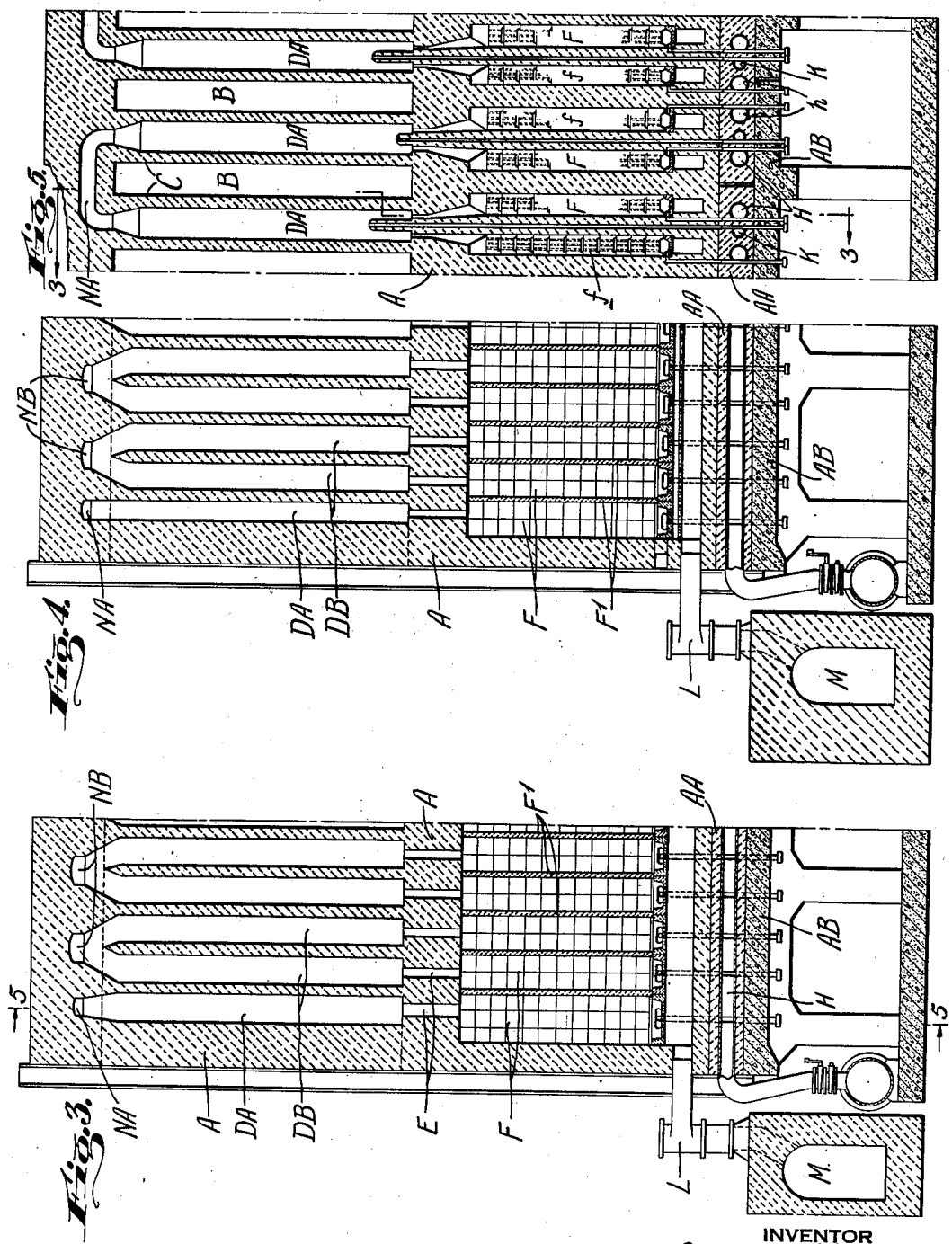

March 19, 1940.         C. OTTO         2,194,404
COKE OVEN
Filed June 16, 1938         3 Sheets-Sheet 3
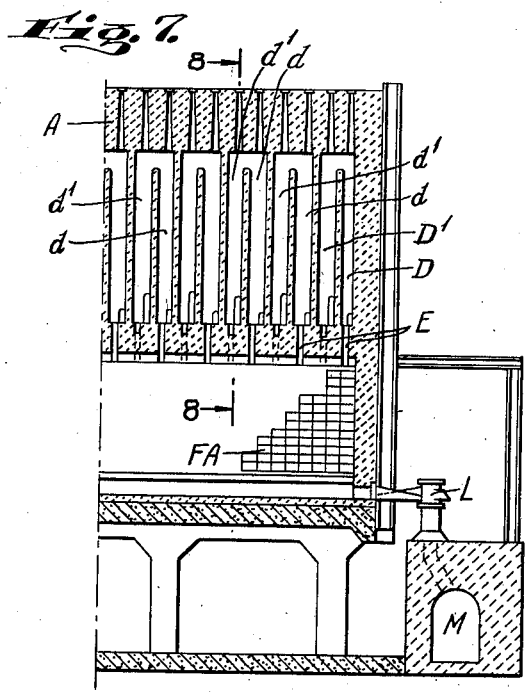
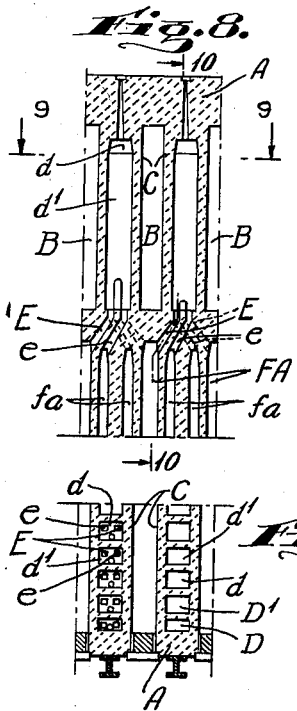
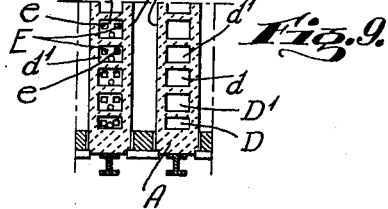
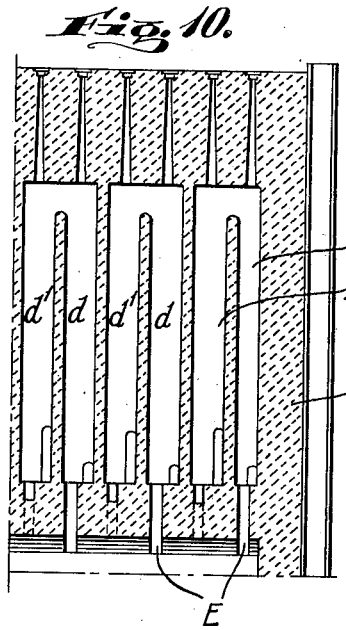
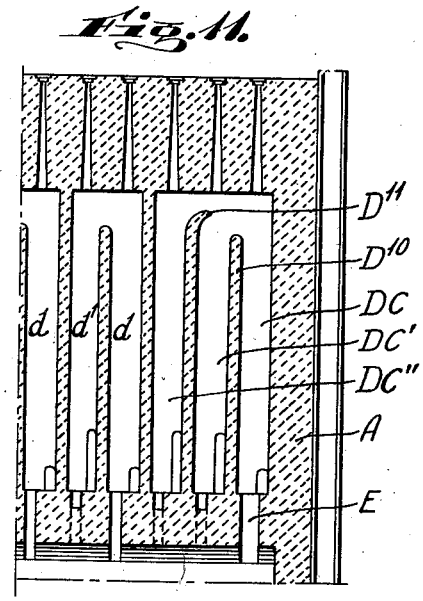
INVENTOR
Carl Otto
BY
John E. Hubbell
ATTORNEY Patented Mar. 19, 1940

2,194,404

UNITED STATES PATENT OFFICE 2,194,404

COKE OVEN

Carl Otto, The Hague, Netherlands, assignor to Fuel Refining Corporation, Dover, Del., a corporation of Delaware Application June 16, 1938, Serial No. 214,132
In Germany June 16, 1937

6 Claims. (Cl. 202—141)

The general object of the present invention is to improve the heating means of horizontal regenerative coke oven batteries having vertically flued heating walls, such as are customarily employed in the manufacture of metallurgical coke. More specifically, the object of the present invention is to provide such a coke oven battery with simple and effective provisions for supplying to each vertical heating flue at the end of a heating wall, the amount of heat needed to enable that flue to furnish its proper share of the total amount of coking heat furnished by the heating wall, and the additional heat needed to compensate for the heat losses at the sides of the battery due to radiation and contact with the atmosphere.

The supply of the proper amount of heat to the end flues of coke oven batteries of the above mentioned type has long been recognized as a troublesome problem. In heating such a coke oven battery by the combustion of rich fuel gas supplied to the different flues through individual regulable supply connections, such as are employed in underfired coke ovens, it is readily possible to proportion the supplies of the fuel gas to the different flues in accordance with the heat requirements of the flues, but there remains the problem of supplying combustion air to the flues in amount proportional to the amount of fuel gas supplied, and preheated to a suitable temperature. Furthermore, such coke oven batteries are usually constructed for optional heating by the combustion of either rich fuel gas which is not, or lean fuel gas which must be regeneratively preheated.

For the proper supply of regeneratively preheated combustion air, or preheated combustion air and lean fuel gas, to the different flues, it is not only necessary to regulate the amounts of regeneratively heated air and gas passing to the different flues, but it is also necessary to pass heating gases from the flues into the regenerators during the regenerator heating periods in such manner as to insure that the regenerators are properly heated up.

When each end heating flue is connected at its upper end to a plurality of flues, some of which serve as upflow and downflow flues during periods in which the end flue and one or more adjacent flues serve as downflow and upflow flues, respectively, the proper distribution of flow through the different flues during periods in which the flow through the end flue is up, will not insure the proper distribution when the flow through the end flue is down. When each end flue is connected at its upper end to a single adjacent flue, in the manner customary in ovens having hairpin flues, the end flue will not receive enough heat except under conditions in which the adjacent flue receives too much heat.

In accordance with the present invention, the gas flow through each heating wall end flue is made proportional to the heating requirement of the flue, not only during the periods in which combustion occurs in the flue, but also during the alternating periods, in which the flue does not serve as a combustion flue, but as a conduit for the passage into the regenerator or regenerators connected to the lower end of the end flue, of products of combustion formed in an adjacent flue or flues.

The present invention comprises means, which may take various forms, for making the ratio of the coking heat requirement of a flue, to the volume of the regenerator space receiving heating gases from and delivering preheated combustion air or preheated combustion air and lean gas to the flue, smaller in the case of each heating wall end flue, than in the case of the adjacent flues. In preferred forms of the present invention, each of the vertical heating flues is connected to an individual regenerator or regenerator section, and in such case, the ratio of flue width measured in the direction of the length of the coking chamber to the volume of the regenerator or regenerator section individual to the flue is smaller in the case of each heating wall end flue, than in the case of the adjacent flues.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a partial transverse section of a horizontal coke oven battery having hairpin heating flues in its heating walls;

Fig. 2 is a section on the line 2—2 of Fig. 1;

Fig. 3 is a section taken similarly to Fig. 1, of a coke oven battery of the cross-over type;

Fig. 4 is a section taken similarly to Fig. 3 of a battery of the cross-over type of modified form;

Fig. 5 is a section on the line 5—5 of Fig. 3;

Fig. 6 is a partial section taken similarly to

Fig. 2, illustrating a modified regenerator supply connection;

Fig. 7 is a section taken similarly to Fig. 1 of a coke oven battery having hairpin flues and with a multiplicity of such flues connected at their lower ends to the same regenerator;

Fig. 8 is a partial section on the line 8—8 of Fig. 7;

Fig. 9 is a partial section on the line 9—9 of Fig. 8;

Fig. 10 is a reproduction on a larger scale of a portion of Fig. 7; and

Fig. 11 is a view taken similarly to Fig. 10 and illustrating a modified construction.

In the drawings and referring first to the construction shown in Figs. 1 and 2, the masonry mass or body A, of the underfired coke oven battery, is formed with coking chambers B, extending transversely of the battery, and with alternating heating walls C, each of the latter being formed with hairpin flues. The end hairpin flue in each heating wall comprises outer and inner flue branches D and D', respectively, connected at their upper ends. The outer flue branch D is narrower, measured in the direction of the heating wall, than the inner branch D'. Each of the intermediate hairpin flues comprises branches d and d', connected at their upper ends, and shown as similar in width, measured in the direction of the length of the heating wall, to one another, and to the flue branch D'.

Each of the different flue branches D, D', d and d' has its lower end connected by a duct or channel E to a corresponding individual regenerator F, and is connected by a corresponding channel e, to a corresponding individual regenerator f. The regenerator chambers F and f are arranged in rows separated by regenerator division walls G and g and the adjacent individual regenerators in the same row are separated from one another by walls F'. Each wall G is a so-called pillar wall, parallel to, beneath, and directly supporting a corresponding heating wall C. Between each two adjacent pillar walls G, is a row of regenerators F, a row of regenerators f, and an intermediate regenerator division wall g, located between and separating the two rows of regenerator sections F and f. Each of the regenerators F and f, between two adjacent pillar walls G, is connected to a flue branch D or d in the heating wall C above one of those pillar walls, and is connected to a flue branch D' or d' in the heating wall above the other of those pillar walls G.

As shown, each of the regenerators F in the same row is supplied with air or lean fuel gas to be preheated in the regenerator by means of a corresponding horizontal distribution pipe H, beneath the masonry mass A, and adjacent and parallel to said row and connected to each of the regenerators in the row, by an individual regulable branch supply connection I. Similarly, each of the regenerators f in one row, receives combustion air to be preheated from a corresponding distribution pipe h, beneath and parallel to said row through an individual regulable branch supply connection i.

The battery shown in Figs. 1 and 2 is adapted for operation, either with the combustion of lean fuel gas preheated in the regenerator sections F, or with rich fuel gas supplied to the different flue branches D, D', d and d' through individual supply channels J, which extends up from the bottom of the masonry mass A through the different intermediate regenerator division walls g.

As shown, the channels J in each wall g are connected at their lower ends to individual regulable outlet branches k from a rich fuel gas distribution pipe K parallel to and beneath the lower edge of the corresponding wall g. The upper end of every second channel J in each wall g is inclined in one direction and extends into communication with one of the flue branches D and d in one of the two adjacent heating walls, while the alternate channels J in the same wall g are inclined in the opposite direction and extend into communication with the flue branches D' and d' in the second of the two adjacent heating walls.

As shown in Figs. 1 and 2, the supply connections I and i open to the regenerators F and f above perforated plates or trays $F^2$ of metal or ceramic material, forming pervious regenerator bottom walls through which each regenerator may pass waste heating gases to a corresponding offtake sole channel $F^3$ or $f^3$ underlying a row of regenerators F or f, respectively. The plates of trays $F^2$ support the regenerator checkerbricks $F^4$ which are shown as having end wall portions which unite to form the walls F' separating the adjacent regenerators F or f in the same row. At one, or each side of the battery, the corresponding end of each sole channel $F^3$ or $f^3$ is connected by a reversing valve L to a corresponding waste heat tunnel M, running longitudinally of the battery.

In the arrangement shown, pairs or rows of regenerators F alternate with pairs or rows of regenerators f. The row of regenerators F and the row of regenerators f at the opposite sides of each intermediate regenerator division wall g, all serve as upflow, or "on," regenerators during regenerator reversal periods, alternating with other periods in which all of said regenerators serve as "off," or downflow regenerators. In consequence, the gas pressures at opposite sides of each wall g are always approximately the same, so that there is no significant tendency to leakage through a wall g from the regenerators at one side of the regenerators at the other side of the wall. The regenerators F or f adjacent and at one side of each pillar wall G are always "on" regenerators, or "off" regenerators when the regenerators F or f at the opposite side of the wall are respectively "off" or "on" regenerators. There is thus normally a leakage producing difference between the pressures at the opposite sides of each wall G and to avoid leakage through those walls, vertical metallic barrier plates O are shown as incorporated in the lower portions of the walls G.

The coke oven battery structure shown in Figs. 1 and 2, includes certain improvements in its regenerators and fuel gas and combustion air supply connections, which are disclosed and claimed in my said copending application Ser. No. 212,084, filed June 6, 1938, but the use of those improvements is not essential to the use of the present invention, which, in the form shown in Figs. 1 and 2, is characterized essentially only in that the ratio of the respective coking heat requirements of the outer and inner branches D and D' of the hairpin flue at the end of the heating wall, is smaller than the ratio of the volumes and preheating capacities of the regenerators respectively connected to the lower ends of those flue branches. The coking heat requirement of the flue branch D is smaller than that of the flue branch D', because the width of the branch D, measured in the direction of the length of the heating wall, is less than the corresponding width of the branch D'. The regenerator F and regenerator f connected at the lower end of the flue branch D, and the regenerator F and regenerator f connected to the lower end of the flue branch D', each have the same width, measured in the direction of the heating wall, and each have the same horizontal cross sectional area.

With the widths of the flue branches D and D' of the end hairpin flues of Figs. 1 and 2, properly proportioned, the supply of fuel gas and combustion air in similar amounts to the flue branches D and D' during the respective periods in which they serve as up-burning or combustion flues, will give to the flue branch D' the amount of heat needed to supply its coking heat requirement, and will give to the flue branch D the amount of heat required to meet its smaller coking heat requirement, and in addition, the amount of heat needed to make up for the loss of heat to the atmosphere at the side of the battery. With similar volumes of gas passing through the different regenerators connected to the lower ends of the flue branches D and D', during the respective "off" periods of the regenerators, the latter are all maintained at the proper operative pressures.

In Figs. 3 and 5, I have illustrated one form, and in Fig. 4 a second form, of the present invention incorporated in a coke oven battery differing from that shown in Figs. 1 and 2, essentially only in that it is of the cross over type. In the form shown in Figs. 3 and 5, each end wall heating flue DA is connected to the end wall flue DA in an adjacent heating wall, by a so-called cross over channel NA, which extends over the top of the coking chamber B between the two heating walls. The intermediate flues DB in each heating wall are connected to correspondingly located intermediate heating flues DB in an adjacent heating wall by cross over channels NB. As shown, each cross over channel NB is connected at each end to two intermediate flues DB in the corresponding heating wall, but the number of intermediate flues connected by a single cross over channel is not important from the standpoint of the present invention.

In the form of the invention shown in Figs. 3 and 5, it is important, however, that while the flues DA and DB are of equal width, measured in the direction of the length of the heating walls, the regenerators F connected to the lower end of each flue DA are wider, measured in the direction of the length of the heating walls, than the regenerators connected to the lower end of each flue DB. In consequence, in the construction shown in Figs. 3 and 5, as in that shown in 1 and 2, the ratio of the coking heat requirement of a flue to the regenerative capacity of the regenerators connected to the lower end of the flue, is greater in the case of the end wall flue, than in the case of an adjacent intermediate flue. In the modification shown in Fig. 4, the same ratio relation is secured by making the width of the end flues DA less than the width of the intermediate flues DB, while making all of the regenerators connected to the different flues of the same width.

As shown in Figs. 3, 4, and 5, the horizontal distribution pipes H, h and K, are imbedded in a special masonry layer AA, included in the masonry mass A between the coke oven brickwork thereof and the subjacent reinforced concrete supporting deck AB, and the branch supply connections from the different conduits include regulating devices which may be like those shown in Fig. 6, and are accessible for adjustment from the basement space beneath the deck AB. In the respects just noted, the construction shown in Figs. 3, 4, and 5, include improvements disclosed and claimed in my said copending application, Ser. No. 212,084.

With the cross over type of oven illustrated in Figs. 3, 4, and 5, each two adjacent regenerators F are both "on" regenerators, or "off" regenerators at any one time, and the same is true for each two adjacent regenerators f. This permits each adjacent pair of regenerators F to be supplied with air or lean gas to be preheated by a single horizontal distribution pipe HA having separate outlets IA to each of the different regenerators F, as shown in Fig. 6. The regulating device $I^{10}$ associated with each outlet IA and accessible from the underside of the battery, comprises an obturator $I^{10}$, supported at the upper end of a rod $I^{11}$, which has its lower end resting on a removable cap $I^{12}$, normally closing the lower end of the corresponding branch pipe IA. Each pipe IA has its upper end in the coke oven brickwork and its lower end below the deck AB, and communicates with the corresponding distribution pipe HA through a lateral port in register with a lateral port in the pipe HA. By replacing an obturator having one cross section, by an obturator having a different cross section, the effective capacity of the branch connection can be varied.

In Figs. 7–10, I have illustrated an embodiment of the invention in an underfired coke oven battery of a well known type having hairpin flues in its heating wall, and cross regenerators arranged in groups of three, each group comprising a regenerator FA adapted for use in preheating either combustion air or lean fuel gas and two side regenerators fa, each used to preheat combustion air, regardless of whether the oven is operating with rich or lean fuel gas. In such batteries, each regenerator may extend for the full width of the battery, but usually extends from one side to the center of the battery and is in end to end relation with a regenerator extending from the center to the other side of the battery.

The flues in each heating wall of the battery shown in Figs. 7–10, comprise an end hairpin flue having a narrow outer branch flue D and a wider inner branch flue D', and intermediate hairpin flues having their branch flues d and d' of the same width as the flue branch D', as in the battery shown in Figs. 1 and 2. Each hairpin branch flue D and d in each heating wall, is connected by a duct E to a regenerator FA beneath the coking chamber B at one side of the heating wall and each flue branch D' and d' in the same wall is connected by a duct E to the regenerator FA beneath the coking chamber at the other side of the heating wall. In addition, the hairpin branch flues D, D', d and d' in the heating wall, are each connected by a corresponding duct e to one or the other of the two regenerators fa immediately adjacent the heating wall and between the regenerators FA, to which the said flue branches are connected by ducts E, the flue branches connected by ducts E to one regenerator FA, being connected by ducts e to the immediately adjacent regenerator fa. Each regenerator fa is thus connected to hairpin branch flues in one heating wall only, while each regenerator FA is connected to hairpin branch flues in each of two adjacent heating walls.

With the arrangement shown in Figs. 7-10, the quantity rate of gas flow is the same through each of the branches D and D' of the hairpin flue D adjacent each heating wall C, with either direction of flow, up or down in either flue branch. In consequence, with the oven constructed and operated as it may be, so that the flue branch D' receives the amount of heat needed to satisfy its coking requirement, the flue branch D will receive the heat needed to meet its coking heat requirement, and the additional amount of heat needed to make up for the loss of heat at the side of the battery. In the construction shown in Figs. 7-10, as in the constructions previously described, the linear velocity of gas flow in the flue at the end of the heating wall, is higher with either direction of flow, than in the adjacent flues or flue branches.

In Fig. 11, I have illustrated an embodiment of the invention in a coke oven battery of the type shown in Figs. 7-10, but differing therefrom in form, in that the flue DC at the end of each heating wall is connected at its upper end to the upper end of the adjacent flue DC', and to the upper end of a second flue DC'', separated from the flue DC by the flue DC'. The three flues DC, DC' and DC'' are connected to the associated regenerators so that they collectively form what may be regarded as a hairpin flue, comprising two branches DC' and DC'', in parallel with one another, and in series with the flue branch DC. With the construction shown in Fig. 11, and with the flue branches DC, DC' and DC'' all of the same width, measured in the direction of the heating wall, the volume, and consequently the velocity of gas flow through the flue DC, will be double that through each of the connected flues DC' and DC''. To facilitate the proper division of the flow through the flues DC' and DC'', the flue division wall $D^{10}$ between the flues DC and DC', is shorter than the flue division wall $D^{11}$ between the flues DC' and DC'', and the upper end of the wall $D^{11}$ is curved toward the adjacent side of the battery.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A horizontal regenerative coke oven battery having heating walls alternating with coking chambers and extending transversely of the battery and formed with vertical heating flues connected at their upper ends in groups for simultaneous and reversible flow up or down through some, and down or up through other flues of each group, and regenerators connected to the lower ends of the flues, whereby the flues of each flue group are included in a flow path which is separate from the flow paths including the other flue groups and which includes in series, a regenerator section, an up flow flue section, a down flow flue section and a regenerator section, each heating wall end flue constituting one entire section of one of said flow paths and the ratio of the cross sectional area of said end flue to the cross sectional area of a second and adjacent section of the same flow path, being smaller than the corresponding ratio of the cross sectional areas of the sections respectively alongside said end flue and second section of each flow path including flues adjacent said end flue and in the same heating wall, so as to maintain a higher velocity of gas flow in each direction in each heating wall end flue, than in the flues adjacent thereto.

2. A coke oven battery as specified in claim 1, in which the heating flues are connected in groups of two, so that each flue forms one branch of a hairpin flue, and in which the flue at the end of the heating wall is of less width measured in the direction of the length of the wall than the adjacent flue forming the other branch of the same hairpin flue.

3. A coke oven battery as specified in claim 1, in which the lower ends of the different flues in each heating wall in which the flow is in the same direction, are connected to different regenerators, whereby each section of each of said flow paths is separated from the corresponding sections of the other flow paths.

4. A coke oven as specified in claim 1, in which the different flues in each heating wall are connected at their upper ends in groups of two, so that each flue forms one branch and an adjacent flue forms the second branch of a hairpin flue and in which the different flues in each heating wall in which the flow is in the same direction are connected at their lower ends to different regenerators and in which the ratio of flue width, measured in the direction of the length of the heating wall, to the cross sectional area of the regenerator or regenerators connected to the lower end of the flue, is greater in the case of the heating wall end flue than in the case of the flues adjacent thereto.

5. A coke oven as specified in claim 1, comprising a cross over channel connecting the end flue in one heating wall to the adjacent end flue in an adjacent heating wall and comprising other cross over channels connecting flues in the first mentioned heating wall to flues in said second heating wall and in which the lower ends of the flues at the end of the heating walls are connected to regenerators, different from those to which the other flues in the heating walls are connected.

6. A coke oven battery as specified in claim 1, in which the end flue in a heating wall is connected at its upper end to the immediately adjacent flue and also to the next adjacent flue, and in which the direction of gas flow in the end flue is up or down when the direction of gas flow in the immediately and next adjacent flues is respectively down or up.

CARL OTTO.